Figure 1:
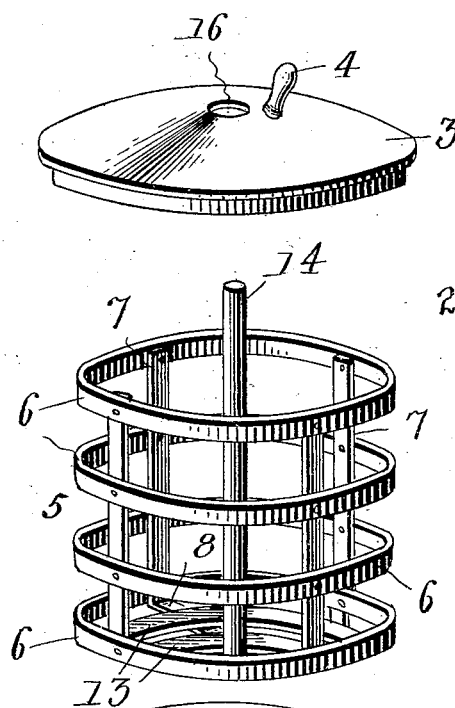

No. 862,903. PATENTED AUG. 13, 1907.
M. HABERMAN.
COOKING UTENSIL.
APPLICATION FILED MAR. 16, 1906.

Witnesses
Jas. A. Koehl.
John E. Burch.

Inventor
Max Haberman
by Watson E. Coleman
Attorney

UNITED STATES PATENT OFFICE.

MAX HABERMAN, OF CLAYTON, IDAHO.

COOKING UTENSIL.

No. 862,903. Specification of Letters Patent. Patented Aug. 13, 1907.

Application filed March 16, 1906. Serial No. 306,429.

*To all whom it may concern:*

Be it known that I, MAX HABERMAN, a citizen of the United States, residing at Clayton, in the county of Custer and State of Idaho, have invented certain new and useful Improvements in Cooking Utensils, of which the following is a specification, reference being had therein to the accompanying drawing.

My invention relates to cooking utensils, and more particularly to those used in boiling tuberous vegetables, such as potatoes, onions, turnips, beets, and also kale, spinach, cabbage, etc., where it is necessary to frequently drain or change the water in which the vegetables are being cooked, one of the objects being to provide a device of the character described whereby the vegetables may be arranged in a frame or basket removably mounted in the kettle or cooking receptacle so that the vegetables can be readily and quickly withdrawn from the water at any time in such manner that the water will at once drain off therefrom.

A further object is to provide a cooking utensil of the character described that shall be simple and inexpensive in construction, effective and easy of operation, and by means of which the vegetables may be withdrawn from the water without the use of any additional utensils, such as spoons, scoops, or the like.

Other objects and advantages of my invention will be obvious from the specification and the drawing, which is filed herewith, and made a part hereof, and in which like reference numerals designate corresponding parts.

Figure 2:
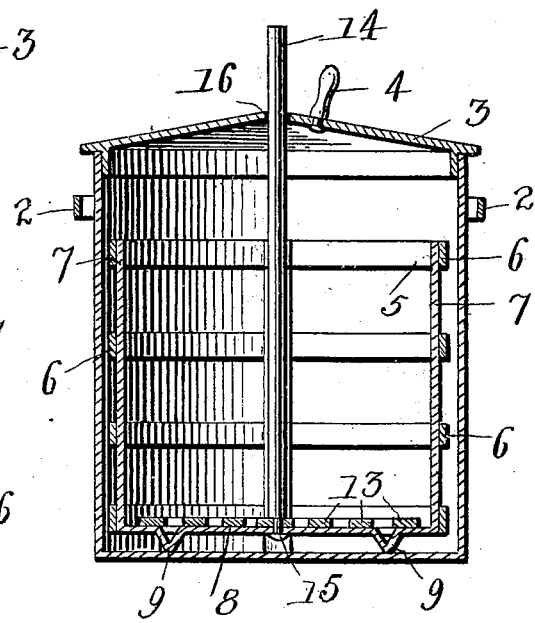
Figure 2:
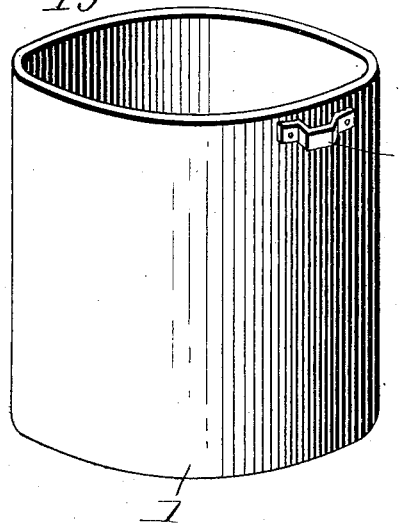
Figure 3:
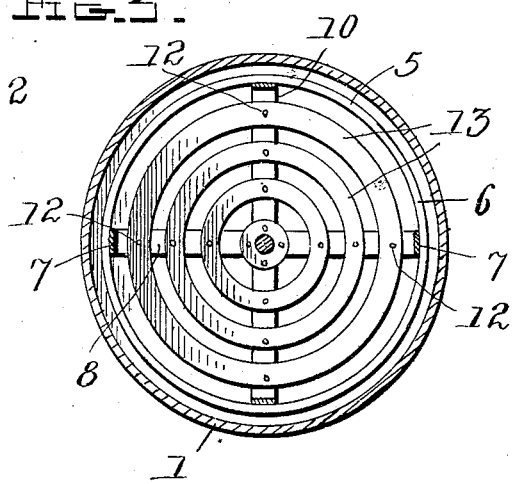

In these drawings, Figure 1 is a perspective view of the complete device showing parts removed, Fig. 2 is a vertical section, and Fig. 3 is a top plan with the cover removed.

1 designates a suitable cooking vessel which may be comprised of any suitable material, such as heavy tin, copper, iron, etc., and which is provided with handles 2. 3 designates a cover provided with a handle 4, said cover being adapted to fit on the top of the vessel 1, as shown in Fig. 2. Arranged to fit in the vessel 1 is a basket or frame 5, preferably made of tin or light sheet metal, and comprised of a plurality of horizontally arranged circular bands 6 supported by the upwardly extending arms 7 formed integral with a horizontally arranged strip 8 which is preferably made of light sheet metal, and bent to form the V-shaped supporting standards 9. Extending at right angles with said strip 8 is another similar strip 10 which has also formed integral therewith V-shaped supporting standards 11 which are similar to the supporting standards 9. Arranged concentrically of each other, and secured to the strips 8 and 10, by rivets 12, or other suitable means, are annular rings 13. These rings are preferably made of tin, or other light sheet metal, and, in conjunction with the strips 8 and 10, they comprise the bottom of the basket or frame 5. At the junction of the strips 8 and 10 is arranged a vertical rod 14 which is secured at its lower end to said strips by a bolt 15, or by any other suitable means, the upper end of said rod passing through an opening 16 in the lid or cover 3.

In operation, the vegetables are placed within the basket or frame 5, the bands 6 and the rings 13 being arranged sufficiently close together to prevent same from passing between them. The basket is then placed in the vessel 1, and the lid placed on the vessel, as shown in Fig. 2, with the upper end of the rod 14 projecting through the openings 16 and extending above the lid any suitable distance to form a handle by means of which the basket may be handled. When the vegetables are cooked, or ready for removal, the lid is removed by means of the handle 4 and the basket or frame 5 is removed by means of the rod 14, the upper end of which may be readily grasped by the hands, and the basket withdrawn from the vessel 1.

From the foregoing, it is thought the construction, operation, and advantages of my invention will be obvious, and further explanation is not deemed necessary.

Having thus described my said invention, what I claim as new and desire to secure by Letters Patent of the United States, is

A cooking utensil comprising a suitable vessel, handles therefor, a lid having a central opening therethrough, and a handle for the lid, in combination with a basket or frame arranged to fit in the receptacle and to rest on the bottom thereof, said basket or frame comprising horizontally arranged circular bands, means for supporting the bands at predetermined distances from each other, a plurality of rings arranged concentrically of each other to form the floor of the basket, means for supporting the rings, means for holding the rings in place, and a vertical rod arranged in the center of the basket or frame and having its lower end secured thereto and its upper end passing through the opening in the lid.

In testimony whereof I hereunto affix my signature in presence of two witnesses.

MAX HABERMAN.

Witnesses:
GEORGE L. BAKER,
THOMAS L. HOWELL.